US005274370A

United States Patent [19]

Morgan et al.

[11] Patent Number: 5,274,370

[45] Date of Patent: Dec. 28, 1993

[54] REDUCED INDICIA HIGH SECURITY LOCKS

[76] Inventors: Douglas J. Morgan, 1815 Port Sheffield, Newport Beach, Calif. 92660; Phillip C. Landmeier, 34950 El Dorado, Lake Elsinore, Calif. 92330

[21] Appl. No.: 742,200

[22] Filed: Aug. 5, 1991

Related U.S. Application Data

[63] Continuation of Ser. No. 348,897, May 8, 1989, abandoned.

[51] Int. Cl.[5] ........................................ H04Q 1/00

[52] U.S. Cl. .......................... 340/825.56; 340/825.31; 341/23

[58] Field of Search ........... 340/825.3, 825.31, 825.56, 340/543; 361/171, 172; 341/22, 23

[56] References Cited

U.S. PATENT DOCUMENTS

| | | | |
|---|---|---|---|
| 3,812,403 | 5/1974 | Gartner | 340/825.31 |
| 4,479,112 | 10/1984 | Hirsch | 340/543 |
| 4,573,046 | 2/1986 | Pinnow | 340/825.31 |

*Primary Examiner*—Donald J. Yusko
*Assistant Examiner*—Edwin C. Holloway, III
*Attorney, Agent, or Firm*—Blakely, Sokoloff, Taylor & Zafman

[57] ABSTRACT

Reduced indicia keyboards for, and high security locks utilizing, key entry of a selectable lock code using a number of keys for the entry of each code element, which number of keys is less than the number of possible variations of that code element. Associated with each key is a code element display, viewable only by one operating the lock, to identify which particular value or variation of the code element is associated with that key at any particular time. By varying the association of the keys and the variations in the code elements, the sequence of key depressions and other observations with respect to the operation of the system without knowledge of the specific indicia associated therewith makes such observations useless in later attempting to operate the lock. Embodiments and methods of operating the same include a number of keys for entry of each code element which is less than the number of variations of that code element, the directional code element display or displays for viewing only by the user, and the non-repetitive and unpredictable operating order of the invention.

45 Claims, 6 Drawing Sheets

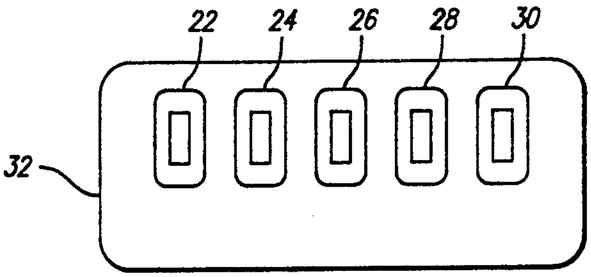
FIG. 1
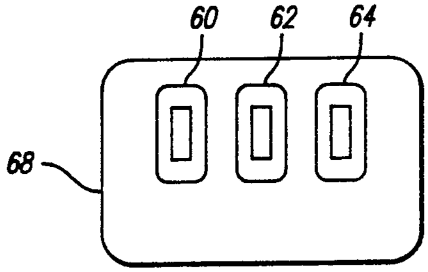
FIG. 6
FIG. 7
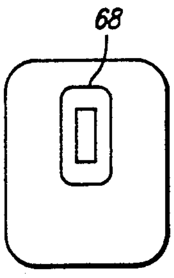
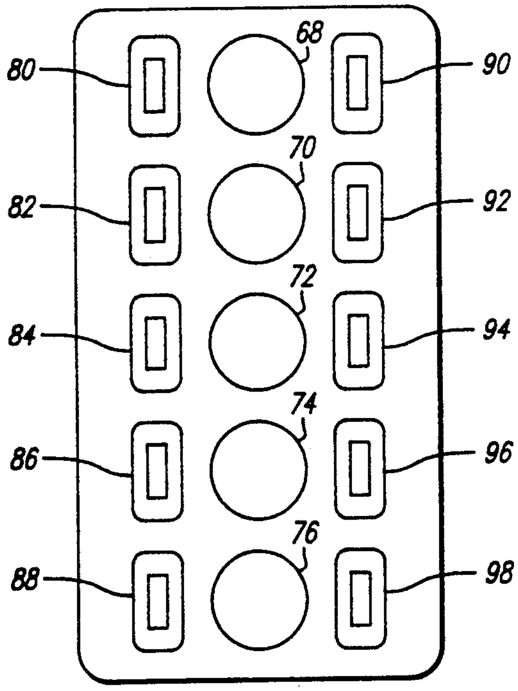
FIG. 9
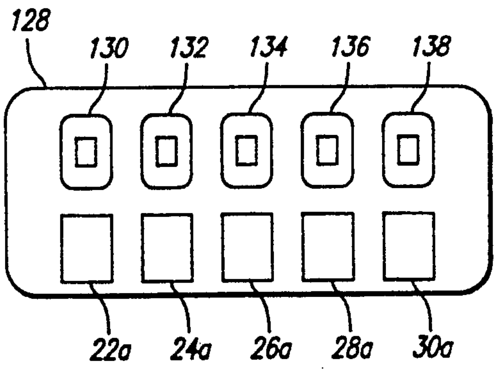
FIG. 11

REDUCED INDICIA HIGH SECURITY LOCKS

This is a continuation of application Ser. No. 07/348,897 filed May 8, 1989 now abandoned.

BACKGROUND OF THE INVENTION

1. Field of the Invention

The present invention relates to the field of high security locks and keyboards for the operation thereof.

2. Prior Art

High security locks of various kinds are well-known in the prior art. One type of such lock of particular interest to the present invention is keyboard operated locks wherein users of the lock are provided a code which, when entered into the keyboard, will operate the same. Such codes may be lock dependent, essentially serving as a combination for the lock, may be user dependent essentially identifying the user to the lock system, or may be a combination of lock and user dependent. An example of the first type of lock are locks controlling access to parts of a secure facility, whereas locks of the second type include those used as part of an automatic teller machine to enable function keys which allow one to withdraw money and conduct other transactions. In that regard, the words lock or locks as used herein are used in a general sense to denote a means for enabling an action which is otherwise disabled, such as the operation of a door latch or the withdrawal of funds in an automatic teller machine, or alternatively, the disabling of something which is normally enabled, such as might be required to lock something normally left unlocked.

In a conventional keyboard operated lock, the level of security attained is relatively low because the number to key assignments are fixed and ordered, and the sequence of key depressions of a user are normally observable from either side of the user without substantial difficulty. To alleviate this problem, and enhance the security of the overall system, keyboards are known wherein the keys are not given a predetermined and ordered 1-2-3 type sequence, but rather are given identifications just prior to use which identifications are effectively scrambled before the next such use. In this manner the physical key depression sequence observed during one operation of the system will have no meaning during the next operation of the system when the keys are identified differently. Further, in such systems the key identifications appearing when the user is standing in front of the keyboard are highly directional, and not observable from the side. Thus, the body of the user blocks the key identifications from view by others, so that while the physical key depressions can be observed from the side, the key identifications associated therewith cannot similarly be determined. Apparatus of this general type is disclosed in U.S. Pat. Nos. 4,644,326, 4,479,112 and 4,333,090. Also, another device having security features which include physical screening as well as mechanical and electronic realignment of numeric key entry functions is disclosed in U.S. Pat. No. 4,032,931.

The foregoing type of device provides high security as well as convenience, and is gaining increased popularity. However, in certain applications the full numeric keyboard may be more expensive than a particular market segment will support, or is larger than desired or required for a particular application, or both. By way of example, in the case of residential locks, a full numeric keyboard may cause the price of the lock to be too high to capture a large market. Also, on a door mounted lock, whether for residential use or otherwise, a full numeric keyboard may not fit conveniently on the door, particularly if one intended to mount the lock on a door already drilled or to be drilled for mounting a conventional lock set. Accordingly, it is to these general objectives that the present invention is directed.

BRIEF SUMMARY OF THE INVENTION

Reduced indicia keyboards for, and high security locks utilizing, key entry of a selectable lock code using a number of keys for the entry of each code element, which number of keys is less than the number of possible variations of that code element. Associated with each key is a code element display, viewable only by one operating the lock, to identify which particular value or variation of the code element is associated with that key at any particular time. By varying the association of the keys and the variations in the code elements, the sequence of key depressions and other observations with respect to the operation of the system without knowledge of the specific indicia associated therewith makes such observations useless in later attempting to operate the lock. Various embodiments and methods of operating the same to provide a number of keys for entry of each code element which is less than the number of variations of that code element, the directional code element display or displays for viewing only by the user, and the non-repetitive and unpredictable operating order of the invention are disclosed.

BRIEF DESCRIPTION OF THE DRAWINGS

FIG. 1 is a face view of a new keyboard in accordance with one embodiment of the present invention;

FIG. 6 is a face view of a first alternate embodiment keyboard in accordance with the present invention;

FIG. 7 is a face view of a second alternate embodiment keyboard in accordance with the present invention;

FIG. 9 is a face view of a third alternate embodiment keyboard in accordance with the present invention.

FIG. 11 is a face view of an alternate embodiment keyboard equivalent to that of FIG. 1.

DETAILED DESCRIPTION OF THE INVENTION

Figure 2:
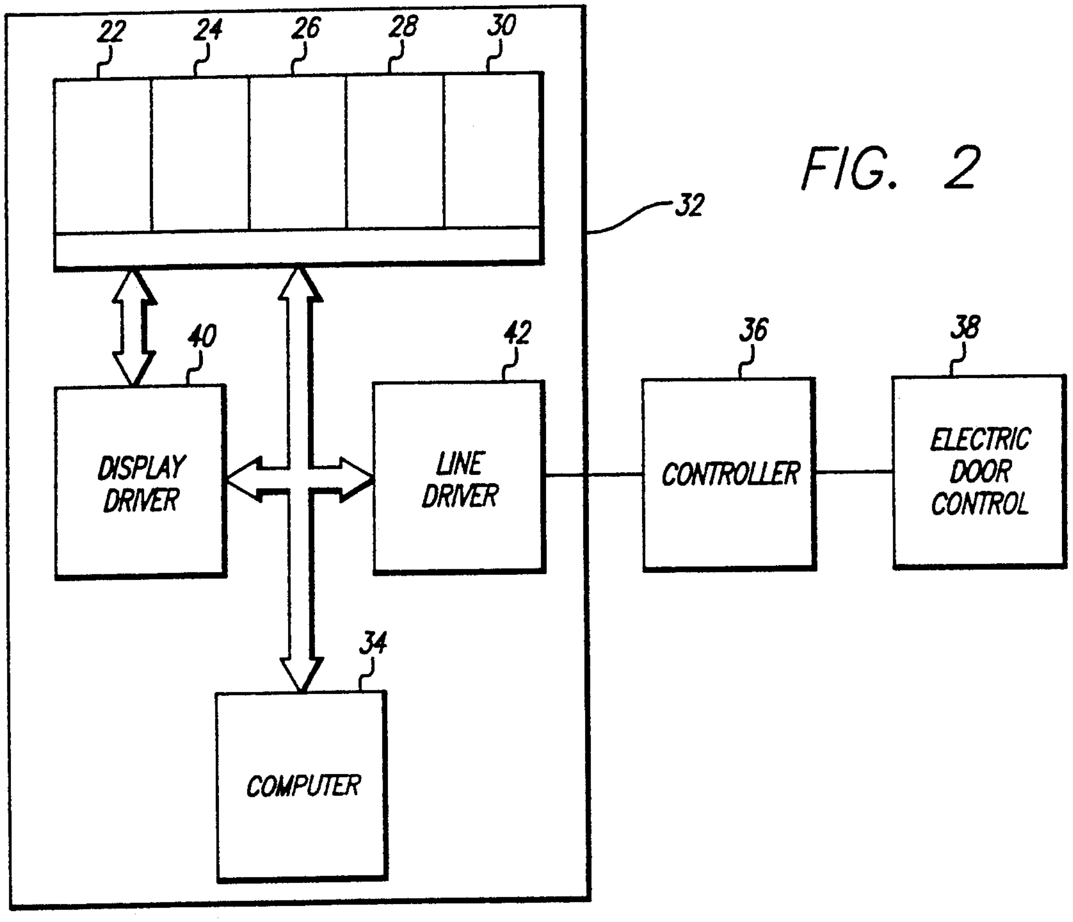
FIG. 2 is a block diagram of the keyboard of FIG. 1 as used in conjunction with a controller and electric door control in a high security lock system.

First referring to FIG. 1, a face view of a keyboard in accordance with one embodiment of the present invention may be seen. The keyboard is characterized by five switches 22, 24, 26, 28 and 30 mounted in enclosure 32 which also houses various control electronics for the keyboard. In this embodiment, the switches 22 through 30 are of the general type disclosed in U.S. Pat. Nos. 4,333,090, 4,479,112 and 4,644,326, namely, membrane type switches each having disposed therein a seven segment light emitting diode display which may be illuminated in various combinations to present the numbers 0 through 9 through the transparent or at least translucent face of each of the respective keys. As shall subsequently be seen in greater detail, the keys are configured to provide a one dimensional light pipe like characteristic so that the numeral being displayed at any time may be viewed over a relatively narrow horizontal angular range. Thus while viewable by a person standing immediately in front of the keyboard to operate the same, the numeral being displayed will not be viewable from the side by one trying to look around the person operating the keyboard.

The keyboard of FIG. 1 may be used in various systems such as a lock system as illustrated in FIG. 2. Here the keyboard, comprising the various elements within the area defined by the line 32, is connected to a controller 36 which in turn controls an electric door control 38, such as an electric strike or electric latch bolt. The controller 36 may respond to a single keyboard to control a single electric door control 38 or, as in many systems, may be coupled to a plurality of keyboards and electric door controls. In such systems, typically the controller 36 is in a relatively secure area and includes therewithin the operating codes for the system so that forceful penetration of the keyboard enclosure will provide no information with respect to the operating codes for the lock, and no ability to operate the lock without such codes.

Within the keyboard enclosure 32 in this embodiment is a single chip computer 34, which not only scans keys 22 through 30 to determine if any of the same are depressed and processes the information if they are, but which also controls the seven segment displays in the keys through a display driver 40, and further provides the communication with controller 36 through a line driver 42. Communication between the keyboard and the controller 36 is most conveniently done on a single line or line pair in serial form, as the required data rates are quite low, though of course other communication forms may also be used if desired.

Figure 3:
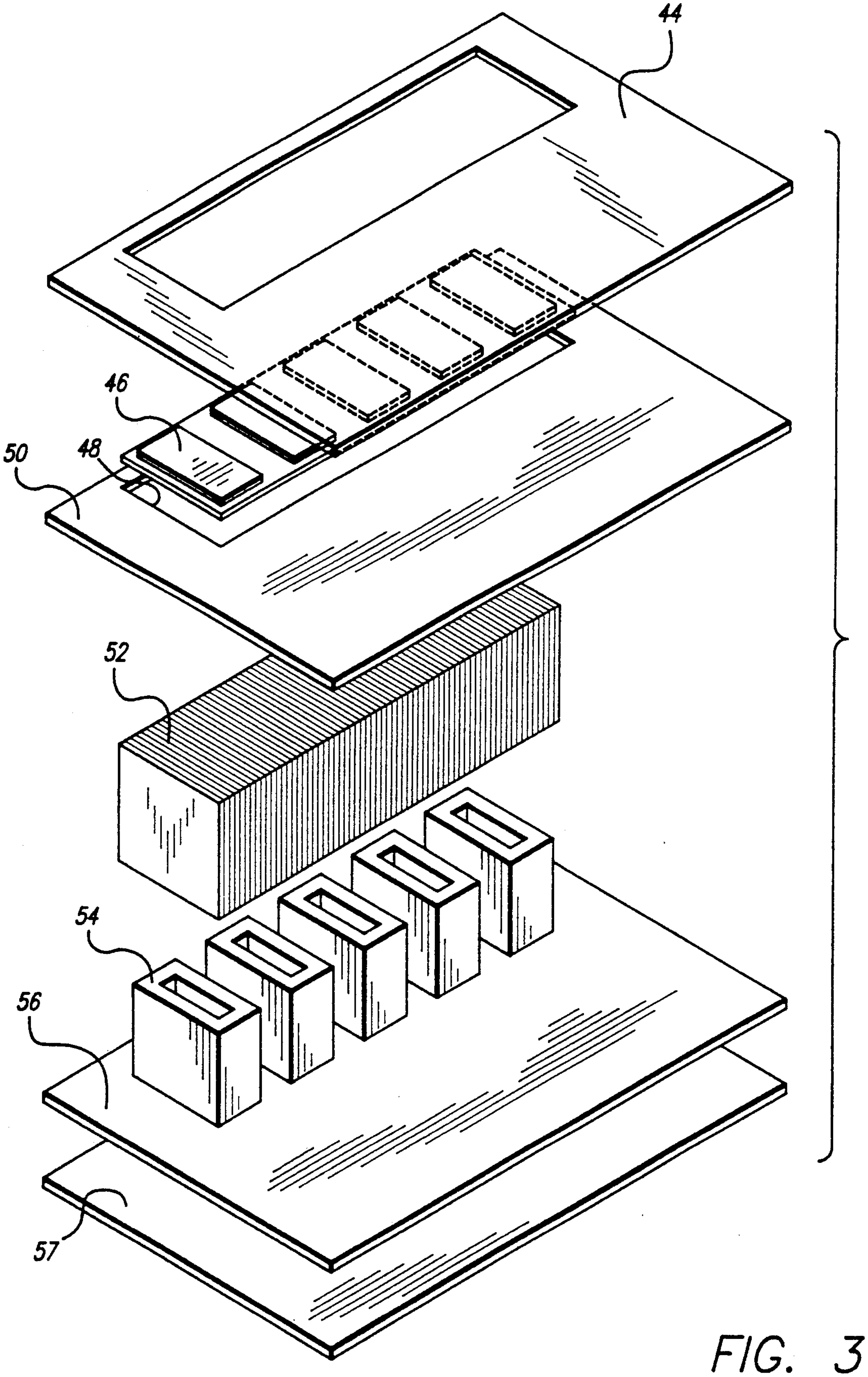
FIG. 3 is an exploded view of the primary elements of the keyboard of FIG. 1.

The construction of the keyboard is generally shown in the perspective of FIG. 3. For purposes of clarity, the enclosure itself is not shown to provide a better view of the internal elements thereof. A keyboard coverplate 44 captures and orients five keycaps 46 thereunder, the keycaps being either transparent or at least translucent so that one can see the light emitting diode display therebelow. The coverplate 44 positions a unitary flexible keycap member 46 in appropriate position over transparent switching areas 48 of a mylar switch element 50 immediately therebelow. Such mylar switching elements comprise first and second layers separated by a spacer layer having openings therein. In each of the switching areas, spaced apart electrical contacts on one of the layers are shorted by, or to appropriate contact regions on the other layer when the same is deflected into contact with the first layer through one of the openings in the spacer layer, such as by depression of one of the keycaps 46. For each key, the key is larger than the associated display, with the traces and contact points of the mylar switch element 50 being outside of the viewing area and being actuated by cooperatively disposed projections on each respective key.

Below the mylar switch assembly 50 is an optical grid 52 adapted to pass light straight therethrough and over a reasonable angular spread in a vertical direction, but in a highly selective manner in the horizontal direction so as to substantially block light angled to any substantial extent to either side. For this purpose, an optical grid 52 may be fabricated utilizing a stack of a plurality of relatively thin clear plastic strips, each roughened and blackened on the faces thereof so as to not reflect light incident thereto. In this manner, light from the seven segment light emitting diode displays 54 therebelow will pass straight through each clear plastic strip, through the transparent switch areas 48 of the mylar switch assembly 50 and through the keycaps 46 to be viewable directly in front of the keyboard. Light emitted by the light emitting diode display 54 to either side at any angle other than very small angles will be blocked by the blackened areas, and thus not visible to one attempting to look around the user standing in front of the keyboard to operate the same.

Finally, the light emitting diode displays 54 are mounted on a printed circuit board 56, with a second printed circuit board 57 being provided if necessary for the electronics contained within the keyboard enclosure. In that regard, while a single chip computer 34 (see FIG. 2) is preferred for use for the keyboard control, microprocessor based systems with separate random access memory and read only memory may also be used as desired. The power to drive the electronics may be provided from a remote location, provided by a battery source associated with the keyboard or may be derived in the keyboard from conventional line power provided thereto.

Figure 4:
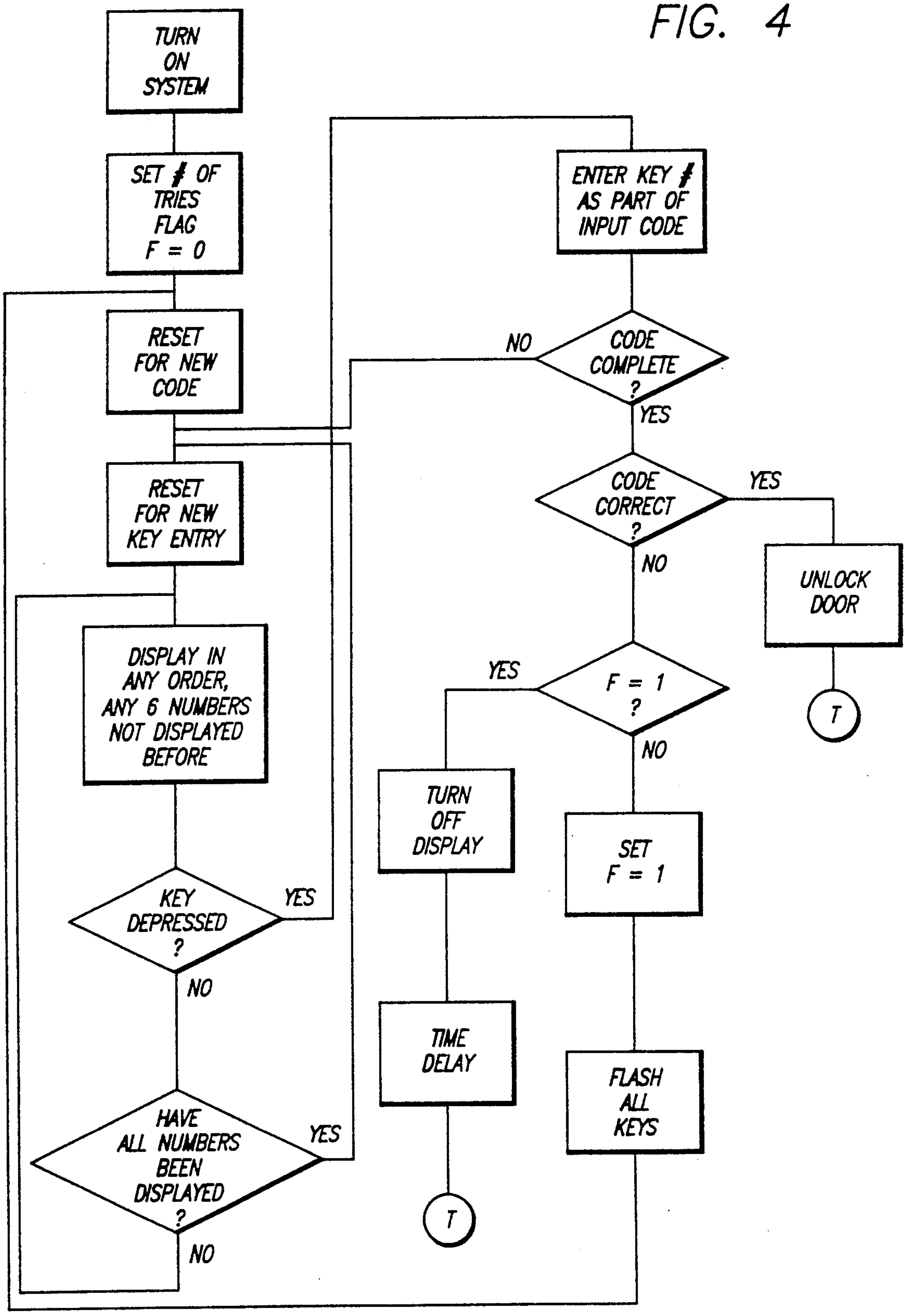
FIG. 4 is a logic flow diagram for one possible mode of operation of the keyboard of FIGS. 1 and 3 and the lock system of FIG. 2.

Now referring to FIG. 4, a logic flow diagram for the keyboard of FIGS. 1 and 3 and the lock system of FIG. 2 may be seen. This logic flow diagram is a general diagram illustrating the various steps in the operation of the embodiment of FIG. 1, though the various operations shown in FIG. 4 may be initiated in various ways, and the steps themselves may be varied as desired, as shall hereinafter be described. As shown in FIG. 4, the first step is normally to turn on the keyboard, particularly if battery powered, as normally battery power would be shut-off to conserve the same to provide maximum battery life. Thus, in the normal quiescent state the electronics, including the displays themselves, are off, or as a minimum, the electronics are maintained in a lower power consumption stand-by state, again with the displays being off. The system may be turned on in any convenient manner, such as by way of example, by actuation of one or more switches of 22, 24, 26, 28 and 30. Obviously, a separate initiation switch may also be provided, though this is not preferred as it adds to the mechanical complexity of the system without any particular need to do so.

Once the system is turned on, a number of tries flag F would be set to zero. In essence, in this example a person is given two tries to try to operate the lock, after which the lock will be disabled for an appropriate time delay, such as, by way of example, something on the order of fifteen seconds to a minute, so that would-be intruder cannot successfully attempt to use a large number of codes over any reasonable length of time. Thereafter, the system is reset for the entry of a code through the keyboard, thereby assuring that the first number entered will be interpreted as the first number of the code, etc. The system is then also reset for a new key entry, which resetting will occur for each key entry throughout the entry of the full code. Then the system displays in any order, any five integer numbers from 0 to 9 not displayed before for that key entry. Obviously the first time through, the numbers can be any of the numbers from 0 to 9. The numbers selected may be purely random numbers, pseudo random numbers or at least represent sufficiently varied possibilities to make physical key depressions meaningless without being able to view the numbers. By way of example, while duplicate numbers could be used when generated by a random number generator, it is preferable to not use duplicate numbers, as duplicate numbers would only increase the time required to operate the lock. Thus, without using duplicate numbers, the first number displayed behind key 22 may be any of ten numbers 0 through 9, the number displayed behind key 24 may be any of the remaining 9 numbers, etc., providing 30,240 possible combinations for the first displays, though as stated before, a lesser number of combinations could be used if desired.

The five keys are then scanned to see if any key is depressed. If not, the system will go on to display five additional numbers, initiated typically by a pause of a substantial fraction of a second or longer during which no key was depressed. Each time this occurs, the system determines whether all numbers from 0 to 9 have been displayed since resetting the system for a new key entry. If they have, perhaps the center segment of all five key numeric characters will be flashed and then the system reset for a new key entry try. If they have not, the system returns to display the five numbers not displayed before, preferably in a random order. If still a number is not selected, as stated before, the entire key entering process is repeated to give the user another opportunity to select the appropriate code number for that digit of the code, this time preferably cycling through the combinations somewhat slower to better accommodate one of less agility, or less familiarity with the device. Note also that one normally would want to limit the number of tries for an individual key entry to avoid excessive power drain by the system operating indefinitely or over a long period of time. This can be done by counting the number of tries and turning off the system when the limit is reached, or alternatively by an overall time-out, to be subsequently more fully described.

When a key is depressed, the number then associated with the key is temporarily stored as the corresponding digit of the input code. Preferably such storage is within the keyboard, with communication with the controller occurring only when the code entry, valid or not, is complete, though alternatively each code element entry may be communicated to the controller and if desired, the controller rather than the keyboard may control the number of times allowed, any time outs, etc. If the code is not complete at that point, the system is reset for a new key entry and the key entry process hereinbefore described is repeated. If the code entry is complete, the entered code is compared with the preset code or codes, typically in the controller, and if the two are the same, the door is unlocked and the system shut-off.

If the code which has just been entered does not match the preset codes, the number of tries flag F is tested to determine if it equals 1. If not, the flag is set to 1, the keys are flashed to indicate that the code was not correct and the system reset for an entry of a new code. If the number of tries flag was already 1, the display is turned off and the time delay is initiated, during which the system will be locked out and inoperable from the outside. After the time delay has expired the system will turn off automatically, and will be ready at any time thereafter for reactivation and operation as described. In general, while the number of tries flag F in FIG. 4 is set to allow two tries, provision may be made for the flag to be manually selected from the controller to allow control of the number of tries to be allowed.

In the system described with respect to FIG. 4, the code length used is generally a matter of design preference, as shorter codes such as a four digit code still provides 10,000 combinations, while longer codes can readily be accommodated without a significant increase in cost. To set and/or change the code, access must be provided to the controller for that purpose.

As an alternative method of operating the keyboard of FIG. 1, the switch numbers may be presented in an ordered fashion, providing the starting point is not predetermined. By way of example, for the entry of each digit making up the code, a random number may be first selected for presentation under switch 22, with switches 24, 26, 28, and 30 then being provided with the next four successive numbers. Upon advancing, the next five successive numbers would be presented, etc., wrapping around from 9 to 0 as called for. Thus, if the desired code digit is 4 when the random number generated as a starting point is 7, switches 22, 24, 26, 28 and 30 would be illuminated with 7, 8, 9, 0 and 1, respectively. On advancing, the same would be illuminated with 2, 3, 4, 5 and 6, respectively. Thereafter, a new random number would be selected as a starting point for the next code digit to be entered. In this manner, since the starting point is random, the time delay, if time dependent, as well as knowledge of the particular key which is depressed provides no information with respect to the specific number being entered, as the starting number, being random, will effectively make every number in the sequence random, at least as viewed by one trying to look around the body of the user.

Figure 5:
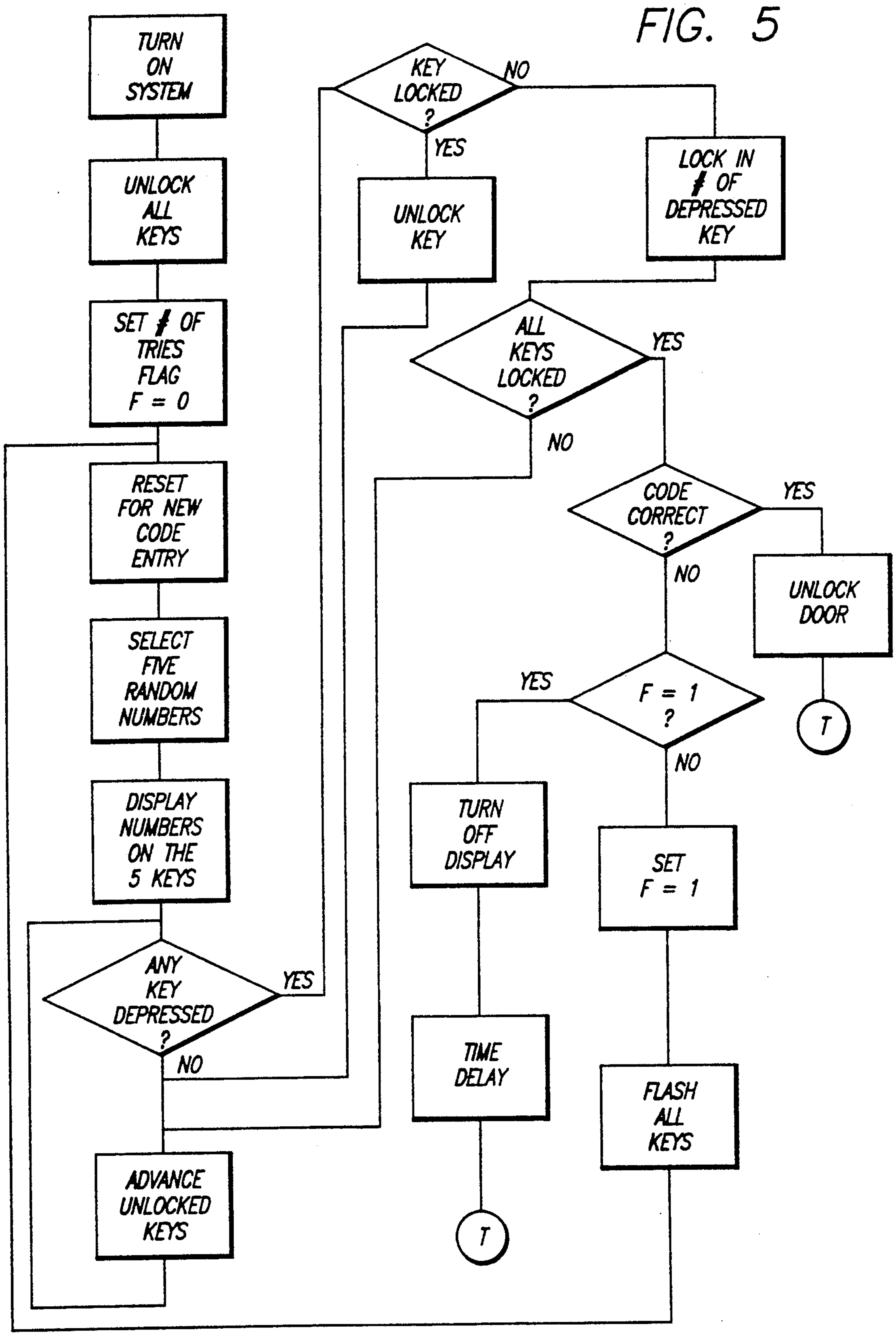
FIG. 5 is a logic flow digram of an alternate method of operating the keyboard of FIG. 1 in a lock system.

As a further alternative method of operation however, the keyboard of FIG. 1 may readily be operated as shown in the logic flow diagram of FIG. 5. As shown therein, the keyboard is first turned on, typically again by depressing any of the five unlighted keys. This would "unlock" each of the five keys, set the number of tries flag F =0 and reset the system for a new code entry. Thereafter, the keyboard selects five random numbers from 0 to 9 and displays the same on the five displays 22 through 30, each display corresponding to a code element in a five element code. The system thereafter tests to see if any keys are depressed during a short delay period, after which all unlocked keys are advanced by one digit and again tested for the delay period. If at any time a key is depressed, that key is tested to see if the key is "locked". Assuming it remains unlocked from the initiation sequence, the number displayed in the depressed key is locked into that key. If all keys are not locked, then the remaining unlocked keys are advanced one digit, with the sequence repeating until all keys are locked. If a key is accidentally pressed at the wrong time, and thus locked into the wrong number at any time before all keys are locked, that key may be again depressed, at which time it will be unlocked so that the correct number may be entered when it sequences therethrough. Finally, when all keys are locked, the code is tested against the preset code as before, unlocking the door if the codes match, and testing the F flag if they do not, to proceed with another try to enter the code or to turn off the display and initiate the time delay depending upon whether the allotted number of tries has been provided.

Now referring to FIG. 6, a face view of an alternate embodiment keyboard may be seen. In this embodiment, the keyboard 58 has three keys 60, 62 and 64 instead of the five keys of FIG. 1. This embodiment may be operated in various ways such as by way of example in accordance with the method of operating the keyboard of FIG. 1 as described with respect to FIG. 4. Similarly, the keyboard of FIG. 6 could be operated in accordance with the general description of FIG. 5, or alternatively if a three digit code is considered too short to be adequately secure, two (or more) successive three digit codes could be used, requiring that those successive codes entered all be correct before the sought after action is enabled, whether the unlocking of a door or some other desired function.

If the keyboard of FIG. 6 is operated in accordance with the method of FIG. 4, it is apparent that to display all of the numbers from 0 through 9 for any code element entry, four display sequences are necessary, though in theory if the selection has not been made on the first three, either the user has made a mistake or the one number not displayed the first three times is the desired number. However, it is preferable for the one remaining number to be displayed on the fourth pass to give the user an opportunity to select or not select that number so as to distinguish between the selection of that number on the one hand and an inadvertent failure to select an earlier displayed number on the other. As a further alternative of course, the number of variations of each code element could be limited to some number divisible by three, such as by way of example, nine, by requiring that the numeric code elements be non-zero code elements.

Figure 8:
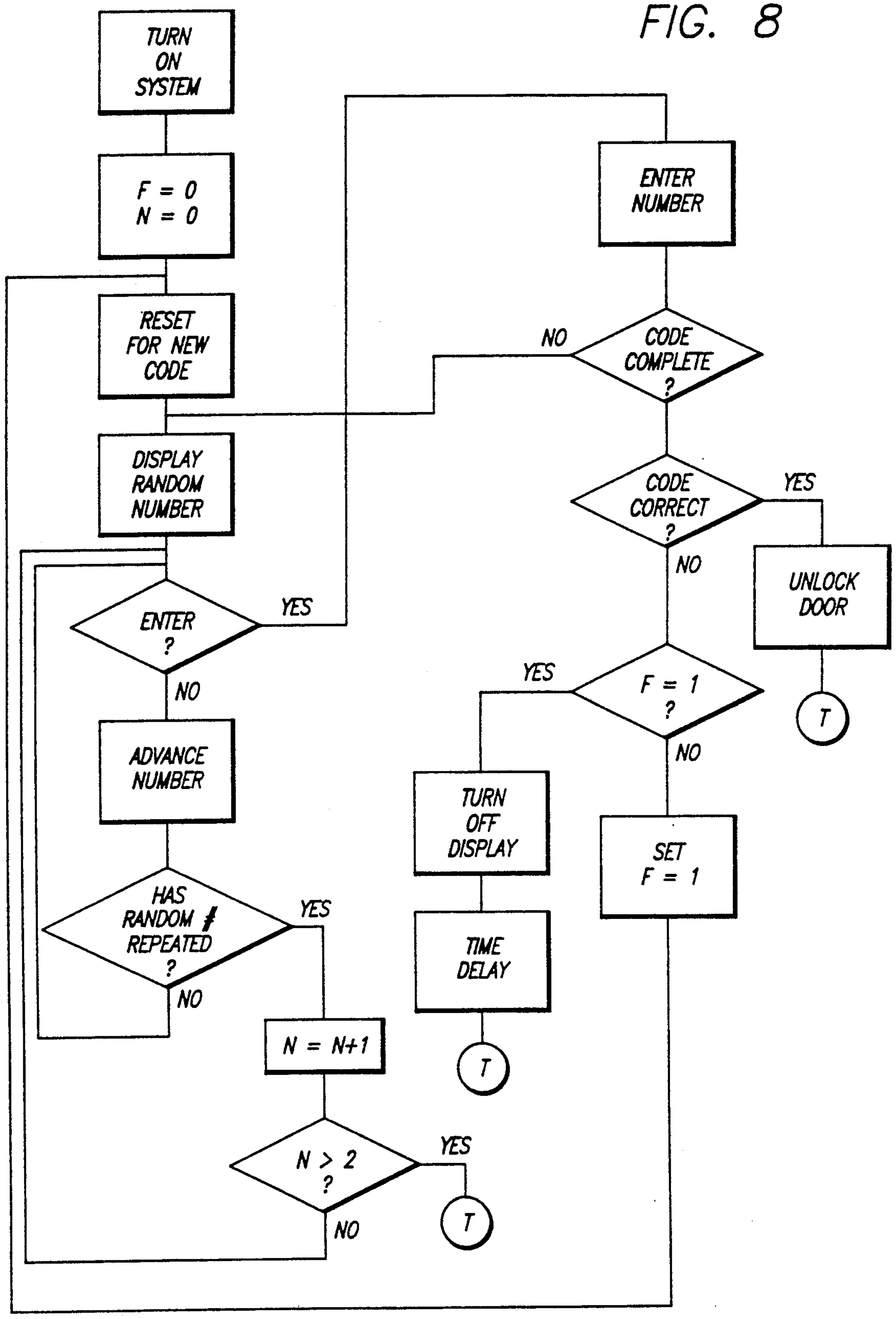
FIG. 8 is a logic flow diagram illustrating one method of operating the keyboard of FIG. 7.

Extending the foregoing, utilizing the concept of a randomly selected starting number, one can create a similarly secure "keyboard" utilizing only a single switch 66 with an illuminated seven segment display associated therewith, or therebehind as shown in FIG. 7. For this embodiment, the logic diagram is shown in FIG. 8. Pushing the switch 66 turns the system on, which first sets the flags F =0 and N =0 and resets the system for receipt of a new code. Thereafter, the control system picks a random number and displays the same so as to be viewable only by the user of the keyboard. If within a predetermined time period, such as by way of example 0.5 seconds, the key is not depressed, the number displayed is advanced and the same is tested against the original random number to determine if the number has been repeated. If not, the time delay is repeated during which the next number in the sequence is displayed. Alternatively, of course, each display could be random, selected from the numbers not displayed before for that code element.

Whenever a particular number being displayed is selected by depression of the key 66, the number is entered as the respective number of the code, and the entered code is tested to see if it is complete. If it is not complete, a new random number is picked and displayed and the entry process repeated. If the code is complete, the code is tested against the preestablished code, and if the two are identical, the door is unlocked or other action enabled and the system turned off as before. Also as before, if they are not identical, the F flag is tested and if not 1, is set to 1, at which time the system returns to reset for a second attempt at entry of the code. If the flag is set, the display is turned off as before and a time delay marked off before the system is shut down, thereby preventing further attempts at coding until the delay period has expired. In this embodiment, if the key is not depressed after the numbers have advanced through all possibilities, the random number initially selected as the starting point for that sequence repeats, in which case the flag N is advanced and tested against some predetermined number of allowable tries, three total in the example of FIG. 8. If the number of allowable tries or repetitions of the number sequence is not exceeded, the starting number is again displayed for the 0.5 second time period and successively advanced through all numbers again. If the number of passes is equal to that allowed, the keyboard will automatically shut down, requiring the person to reinitiate the entire sequence.

A still further alternate embodiment may be seen in FIG. 9. In this embodiment the key switch and the display are separate elements, and unlike the previously described embodiments, are not equal in number. In particular, five keys 68, 70, 72, 74 and 76 are disposed in a central column of the keyboard 78, with displays 80, 82, 84, 86 and 88 being disposed to the left thereof, respectively, and logically associated therewith, and further with displays 90, 92, 94, 96 and 98 disposed to the right thereof, respectively, and also logically associated therewith. Thus, while there are a total of five keys, there are also a total of ten displays associated therewith, allowing the simultaneous display of all digits of zero through nine. To achieve the desired viewing restriction for the displays, an optical grid like optical grid 52 of FIG. 3 may be provided over each display in a well or below a set of louvres so as to only be viewable stright on. Also of course, in the previously described embodiments the displays and the keys may be separate devices logically associated with each other on a one on one basis, with similar techniques being useable therewith also. As before, this embodiment too may be operated in various ways. By way of example, the digits on the left may be the digits 0 through 4 randomly ordered, with the digits on the right being the digits 5 through 9 similarly ordered. Thus, the digits 0 and 5, 1 and 6, etc. are always associated, thus aiding in the operation of the keyboard by a user. In this form, the ten displays associated with the five keys in essence provide an immediate conversion of a code from one having ten variations of each code element to one having only five variations of each code element, as each key selection is a one of five selection anyway. On the other hand, if there is any chance of someone other than a user seeing, for instance, the displays at one side of the keyboard, but not those of the other, then such fixed left to right display associations should not be used. Instead, either a totally random assignment or at least a fully well scrambled assignment of the numbers 0 through 9 to the displays should be used, or alternatively, the digits 0 through 4 should be randomly assigned to the left displays and the digits 5 through 9 independently randomly assigned to the right hand displays.

There has been described herein, various embodiments of keyboards and keyboard operated lock systems which provide high security, yet are particularly compact and of relatively low cost. These systems utilize a code made up of a plurality of code elements, each code element having a number of variations exceeding the number of keys on the lock. Thus, while the keys are used to enter each code element to operate the lock, the number of keys available for such entry is less than the number of variations in each code element to be entered therethrough. While most of the embodiments hereinbefore disclosed utilize the integers 0 through 9 for the variations in the code elements, e.g. numeric code elements, one may also use other code elements or ranges thereof. By way of a specific example given earlier, one might use the integer numbers 1 through 9, making up numeric codes which do not include 0. In this case, the embodiment of FIG. 6 could present all possible number selections in three successive presentations rather than four. Also, one could use double digit numbers, or alphanumeric characters whereby the codes would be code words rather than a number, or a combination of words and numbers. One could also use symbols or pictures rather than letters or numbers, perhaps easier to remember for children for keyboards that are to be operated thereby. In that regard, while FIG. 2 was described in terms of a typical security system wherein the keyboard controller and electric door control are separate elements, the same could also be in the form of a unitary assembly such as for consumer use as an entry door lock.

Figure 10:
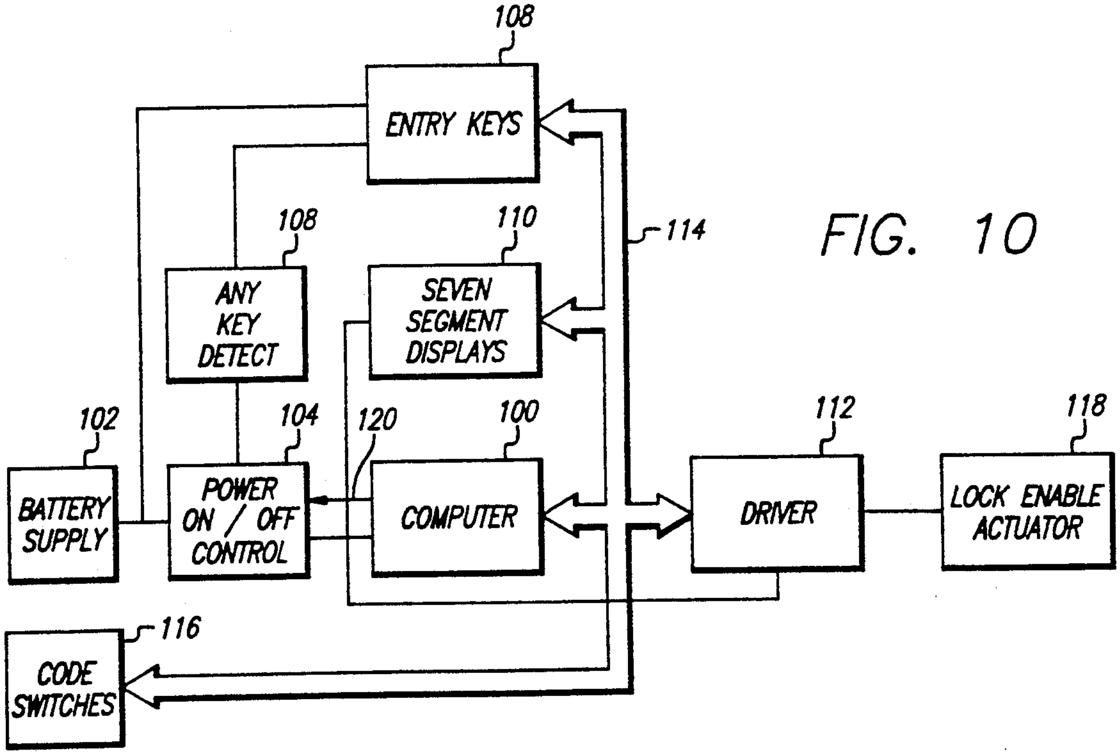
FIG. 10 is an expanded block diagram of the support electronics that may be used with any of the foregoing keyboards as part of a self contained entry door lock.

Typical circuitry for operating any of the foregoing embodiments in an entry door lock is shown in expanded form in FIG. 10. A single chip computer 100 with onboard RAM and ROM in which the program is stored is powered by a battery power supply 102 through a power on/off control 104. The entry key or keys 56 (which could include one or more knob actuated or other switches) are connected to the battery power supply 102 so that even with power otherwise off as determined by the power on/off control 104, a depression of any of the entry keys 106 will be sensed by the any key detect circuit 108 to turn on power to the computer 100, the seven segment displays 110, and to the driver 112. The computer then proceeds under program control through the program stored in read-only memory (ROM) therein to control the seven segment display 110 and to scan the entry keys 106 through the computer bus or buses 114. When the entire code has been entered, the code is compared with the stored code, and if the same match, the driver is enabled to operate the lock enable actuator 118, typically a pulse type actuation to enable a one time operation of the latch mechanism through the external door knob, unless the lock is unlocked from the inside. In general the system may be programmed through the keypad or from outside through a computer port. Alternatively the code may be entered through code switches such as code switches 116 accessible through a removable panel in the inside side of the door latch operating mechanism.

If the displays are advanced under control of the user, say by movement of the doorknob or control of some other control switch, the power on/off control 104 may most conveniently turn the power off based upon the passage of a predetermined length of time from turn-on, so that the person cannot inadvertently leave power on to the system for prolonged periods. If on the other hand the system is advanced through its operating routine on a time basis, the power on/off control may turn off the power either on a time basis or in response to a signal from the computer 100. If the turn off is on a time basis, such turn off will normally occur on the order of 10 to 15 seconds after turn on. Accordingly, the time delay to be imposed after the allotted number of tries to enter the proper code has been given will require a periodic resetting of the time delay in the power on/off control 104 by a signal thereto from the computer on line 120. If on the other hand the computer itself directly controls the power off, then the turn off signal whenever desired will be provided to the power on/off control 104 from the computer 100 through line 120. Also, while power when on is coupled to the seven segment display 110 as well as computer 100 and driver 112, the computer 100 is capable of controlling the display 110 through the bus 114 so that all displays may be turned off when desired, whether for flashing purposes or for maintaining the same off during the long time delay when the allotted number of tries at opening the lock have not been successful.

For a full range of alphanumeric characters in any of the embodiments hereinbefore described, specifically A through Z and 0 through 9, each code element has a possibility of 36 variations, which provides highly unique codes using only a few code elements. By way of example, using only three code elements, a total of 46,656 combinations are provided. The difficulty with such a large number of possible variations in each code element however, is that it may take an unreasonable length of time to enter the code. In particular, on the average each code element will have to be cycled through approximately one half of its possible variations before the desired code element is presented for selection. Thus for a three element code with each element having the full alphanumeric or 36 variation range, each code element on the average would have to be cycled through 18 of its variations. For a five digit code using the numbers 0 through 9 to give 100,000 combinations, each code element would on the average only have to be cycled through five of its variations. Going to the other extreme, a sixteen bit binary code will provide 65,536 combinations. On the average, half the bits will initially come up correct, meaning that on the average only one step of half the code elements is required for the entry of the code. However, such long codes would probably be difficult to remember, so that a reasonable number of variations of each is preferred, probably most conveniently obtained by using the numbers 0 through 9, or 1 through 9 as a compromise.

Now referring to FIG. 11, an alternate embodiment of the keyboard of FIG. 1 may be seen. As with the embodiment of FIG. 1, the keyboard 128 of FIG. 11 has five keys 22*a* through 30*a*, each associated with one of the displays 130 through 138, though unlike FIG. 1 wherein the keys and displays are both integrated into the keys 22 through 30 the keys 22*a* through 30*a* of FIG. 11 are separate from the displays 130 through 138 though located immediately therebelow so that each key is still logically associated with each display. Again it is highly desirable to have the viewing range of displays 130 through 138 highly limited in the horizontal direction. For this purpose the same type of instruction may be used as previous described. Alternatively, each display may be sunk within its own well and/or louvers may be used to limit the normal horizontal viewing extent of the digits, though of course still other techniques might be used if desired. Also in some cases additional keys may be provided for other purposes. By way of example, an asterisk key (or symbol appearing on a data element key) might be used for programming, or an enter key (or symbol on a data element entry key) might be used o provide a variable code length.

While the present invention has been disclosed and described with respect to various embodiments thereof, it will be understood by those skilled in the art that various changes in form and detail may be made therein without departing from the spirit and scope thereof.

We claim:

1. A keyboard for manual entry of data in the form of a series of data elements, each data element having a first number of possible data element variations comprising:

a second number of manually operable data element entry keys, said second number being less than said first number, wherein said first number of data element variations is partitioned into a plurality of groups of said data element variations, each said group having a third number of said data element variations which data element variations are substantially randomly selected from said first number of data element variations, said third number being less than or equal to said second number, and wherein each said data element variation belongs to only one of said groups;

display means logically associated with each of said keys, whereby the data element variations belonging to one or said groups are displayed, one group at a time, and whereby all possible variations of each data element may be displayed, and wherein each said data element variations is substantially randomly associated with one of said keys and wherein each said data element variation is logically associated with one of said keys for selection by manual depression of the respective said key; and keyboard control means coupled to said keys and said display means, said keyboard control means being means for variably controlling said display means to vary the logical associations of data elements with keys from time to time;

whereby a limited number of keys may be used for entry of data elements, each having a larger number of possible variations than the number of keys, and whereby observance of a sequence of manual key actuations without seeing the then assigned key-data element associations does not convey knowledge of the data sequence entered thereby.

2. The keyboard of claim 1 wherein said display means is a directionally oriented display means for visibly displaying said data elements in a manner viewable only over a limited angular range of view.

3. The keyboard of claim 1 wherein said display means is integral with said keys.

4. The keyboard of claim 1 wherein said display means is independent of and physically located so as to be logically associated with each of said keys.

5. The keyboard of claim 1 wherein said display means comprises a number of displays, each logically associated with one of said keys.

6. The keyboard of claim 5 wherein the number of displays is a multiple of the number of keys, whereby a respective plurality of data elements may be associated with each key at any one time.

7. The keyboard of claim 6 wherein said keyboard control means is a means for varying from time to time the data elements making up any of the last named plurality of data elements.

8. The keyboard of claim 6 wherein the data elements are the integer numbers zero through nine, and wherein the number of keys is five and the number of displays is ten.

9. The keyboard of claim 5 wherein the number of displays is equal to the number of keys, and wherein said keyboard control means is a means or receiving a data element entry resulting from a manual key depression by causing (i) each display to display a different variation of data element not displayed before for that data element entry, whereby a portion of the possible data element variations are displayed at one time, (ii) the entry of the respective data element if a key is manually depressed, and (iii) if a key is not depressed within a predetermined length of time, the repeat of (i) through (iii) until the first to occur of a key entry or the display of all possible variations of the data elements, and for each subsequent data element entries, controlling the displays to change the key - data element associations of (i) and (ii).

10. The keyboard of claim 9 wherein said keyboard control means is a means for repeating the data element entry sequence if no key is depressed during the first sequence until a key is manually depressed or the sequence is repeated a predetermined number of times.

11. The keyboard of claim 9 wherein the keyboard control means is a means for causing each display to display a different data element, the data elements displayed at any one time collectively representing a segment of a predetermined ordered sequence of all possible variations of a data element, and upon display of the next portion of the possible data elements not displayed before, to display the next successive segment of the ordered sequence, the keyboard control means being a means for varying the starting point of the segment of the ordered sequence used for each successive key entry.

12. The keyboard of claim 9 wherein said control means is a means for causing each display to display a different data element substantially randomly selected from the variations of data entry.

13. The keyboard of claim 9 wherein the number of keys and the number of displays is 3.

14. The keyboard of claim 9 wherein the number of keys and the number of displays is 5.

15. A lock system comprising:

a keyboard for manual entry of at least one code in the form of a series of code elements, each code element having a first plurality of possible code element variations, said keyboard having a second plurality of manually operable data element entry keys, said second plurality being less in number than said first plurality, wherein said first plurality of code element variations is partitioned into a plurality of groups of said code element variations, each said group having a third number of said code element variations which code element variations are substantially randomly selected from said first number of code element variations, said third number being less than or equal to said second plurality, and wherein each said code element variation belongs to only one of said groups;

display means logically associated with each of said keys, whereby the code element variations belonging to one of said groups are displayed, one group at a time, and whereby all possible variations of each code element may be displayed, and wherein each said code element variation is substantially randomly associated with one of said keys and wherein each said code element variation is logically associated with one of said keys for selection by manual depression of the respective said key;

keyboard control means coupled to said keys and said display means, said keyboard control means being a means for variably controlling said display means to vary the logical associations of code elements with keys from time to time, whereby a limited number of keys may be used for entry of data elements, each having a larger number of possible variations, and which observance of a sequence of manual key actuations without seeing the then assigned key-code element variation associations does not convey knowledge of the code entered thereby;

a lock control for enabling and disabling a specific action; and a controller coupled to said keyboard control means and said lock control for comparing a code manually entered through said keyboard with at least one predetermined code, and activating said lock control in response to a match between the manually entered code and the predetermined code.

16. The lock system of claim 15 wherein said display means is a directionally oriented display means for visibly displaying said code elements in a manner viewable only over a limited angular range of view.

17. The lock system of claim 15 wherein said display means is integral with said keys.

18. The lock system of claim 15 wherein said display means is independent of and physically located so as to be logically associated with each of said keys.

19. The lock system of claim 15 wherein said display means comprises a number of displays, each logically associated with one of said keys.

20. The lock system of claim 19 wherein the number of displays is a multiple of the number of keys, whereby a respective plurality of code elements may be associated with each key at any one time.

21. The lock system of claim 20 wherein said lock system control means is a means for varying from time to time the code elements making up any of the last named plurality of code elements.

22. The lock system of claim 20 wherein the code elements are the integer numbers zero through nine, and wherein the number of keys is five and the number of displays is ten.

23. The lock system of claim 19 wherein the number of displays is equal to the number of keys, and wherein said lock system control means is a means for receiving a code element entry resulting from a manual key depression by causing (i) each display to display a different variation of code element not displayed before for that code element entry, whereby a portion of the possible code element variations are displayed at one time, (ii) the entry of the respective code element if a key is manually depressed, and (iii) if a key is not depressed within a predetermined length of time, the repeat of (i) through (iii) until the first to occur of a key entry or the display of all possible variations of the code elements, and for subsequent data element entries, controlling the displays to change the key - code elements associations of (i) and (ii).

24. The lock system of claim 23 wherein said lock system control means is a means for repeating the code element entry sequence if no key is depressed during the first sequence until a key is manually depressed or the sequence is repeated a predetermined number of times.

25. The lock system of claim 23 wherein the lock system control means is a means for causing each display to display a different code element, the code elements displayed at any one time collectively representing a segment of a predetermined ordered sequence of all possible variations of a code element, and upon display of the next portion of the possible code elements not displayed before, to display the next successive segment of the ordered sequence, the lock system control means being a means for varying the starting point of the segment of the ordered sequence used for each successive key entry.

26. The lock system of claim 23 wherein said control means is a means for causing each display to display a different code element substantially randomly selected from the variations of code entry.

27. The lock system of claim 23 wherein the number of keys and the number of displays is 3.

28. The lock system of claim 23 wherein the number of keys and the number of displays is 5.

29. A keyboard for manual entry of a code in the form of a series of code elements, each code element having a first number of possible code element variations comprising:

a second number of manually operable code element entry keys, said second number being less than said first number, wherein said first number of code element variations is partitioned into a plurality of groups of said code element variations, each said group having a third number of said code element variations which data element variations are substantially randomly selected from said first number of code element variations, said third number being less than or equal to said second number, and wherein each said data element variation belongs to only one of said groups;

display means logically associated with said entry keys for displaying said code element variations, one by one, whereby all possible variations of each code element may be displayed and wherein a first code element variation is substantially randomly assigned to said key for selection by manual depression of the entry keys; and keyboard control means coupled to said entry keys and said display means, said keyboard control means being a means for variably controlling said display means for each code element entry to display each code element variation, one after another for selection by depressing the keys, and for successive key entries, displaying each code element variation, one after another, in a sequence differing in some manner from the previous sequence;

whereby a key may be used for entry of code elements, each having a number of possible variations, and wherein observance of a sequence of manual key actuations or the timing thereof without seeing the then assigned key - code element variation associations does not convey knowledge of the code entered thereby.

30. The keyboard of claim 29 further comprised of a lock control for enabling and disabling a desired action.

31. The keyboard of claim 29 wherein said keyboard control means varies each sequence by varying the sequence in which the code element variations are displayed.

32. The keyboard of claim 29 further comprised of a lock control for enabling and disabling a desired action; and a controller coupled to said keyboard control means and said lock control for comparing a code manually entered through said keyboard with at least one predetermined code, and activating said lock control in response to a match between the manually entered code and the predetermined code.

33. A lock system comprising:

a keyboard for manual entry of at least one code in the form of a series of code elements, each code element having a first plurality of possible code element variations, said keyboard having a second plurality of manually operable data element entry keys, each positioned with respect to each other so that each may be logically associated with a code element position, wherein said second plurality is less in number than said first plurality, and wherein said first plurality of code element variations is partitioned into a plurality of groups of said code element variations, each said group having a third number of said code element variations which code element variations are substantially randomly selected from said first number of code element variations, said third number being less than or equal to said second plurality, and wherein each said code element variation belongs to only one of said groups;

display means logically associated with each of said keys, whereby the code element variations belonging to one of said groups are displayed, one group at a time, and whereby all possible variations of each code element may be displayed, one at a time and in a substantially random order for selection as the respective code element by manual operation of the key while the desired code element variation of that code element is being displayed;

keyboard control means coupled to said keys and said display means, said keyboard control means being a means for variably controlling said display means to cause each display to start displaying one at a time, all variations of each code element, and to receive as a code element entry for the respective code position, the code element variation displayed at the time the respective key was depressed;

a lock control for enabling and disabling a specific action; and a controller coupled to said keyboard control means and said lock control for comparing a code manually entered through said keyboard with at least one predetermined code, and activating said lock control in response to a match between the manually entered code and the predetermined code.

34. The lock system of claim 33 wherein said keyboard control means is also a means for controlling said display means to start displaying, one at a time, the variations of each code element in a different manner for subsequent code entries.

35. A lock system comprising:

a keyboard for manual entry of at least one code in the form of a series of code elements, each code element having a first plurality of possible code element variations, said keyboard having a second plurality of manually operable data element entry keys, wherein said second plurality is less in number than said first plurality, and wherein said first plurality of code element variations is partitioned into a plurality of groups of said code element variations, each said group having a third number of said code element variations which code element variations are substantially randomly selected from said first number of code element variations, said third number being less than or equal to said second plurality, and wherein each said code element variation belongs to only one of said groups;

display means logically associated with each of said keys, whereby the code element variations belonging to one of said groups are displayed, one group at a time, and whereby all possible variations of each code element may be displayed, one at a time and in a substantially random order for selection as the respective code element by manual operation of the key while the desired code element variation of that code element is being displayed;

keyboard control means coupled to said keys and said display means, said keyboard control means being a means for controlling said display means to cause each display to start displaying one at a time, all variations of each code element, and to receive as a code element entry for the respective code position, the code element variation displayed at the time the respective key was depressed;

said keyboard control means also being a means for controlling said display means to start displaying, one at a time, the variations of each code element in a different manner for subsequent code element entries.

36. The lock system of claim 35 wherein said keyboard control means is a means for controlling said display means to start displaying, one at a time, the variations of each code element in an ordered manner, and for subsequent code element entries, displaying the variations of each code element in the same ordered manner using different starting points.

37. The lock system of claim 35 wherein said keyboard control means is a means for controlling said display means to start displaying, one at a time, the variations of each code element in an unordered manner, and for subsequent code element entries, displaying the variations of each code element in different unordered manners.

38. The lock system of claim 35 wherein the number of keys is 5.

39. The lock system of claim 38 wherein the number of keys is 3.

40. The lock system of claim 38 wherein the number of keys is 1.

41. A method of manual entry of data in the form of a series of data elements using a keyboard, each said data element having a first number of possible data element variations, said method comprising the step of:

(a) providing a second number of manually operable data element entry keys, wherein said second number is less than said first number, wherein said first number of data element variations is partitioned into a plurality of groups of data element variations, each said group having a third number of said data element variations which data element variations are substantially randomly selected from said first number of data element variations, said third number being less than or equal to said second number, and wherein each said data element variation belongs to only one of said groups;

(b) providing a display logically associated with each of said keys for displaying said data elements, whereby the data element variations belonging to one of said groups are displayed, one group at a time, and whereby all possible variations of each data element may be displayed, and wherein each said data element variation is substantially randomly associated with one of said keys and wherein each said code element variation is logically associated with one of said keys for selection by manual depression of the respective said keys;

(c) providing a keyboard control coupled to said keys and said display, wherein said keyboard control provides for variably controlling said display to vary the logical associations of data elements with keys from time to time; and (d) using said data element entry keys for entry of data elements, each having a larger number of possible variations than the number of keys, and whereby observance of a sequence of manual key actuations without seeing the then assigned key-data element associations does not convey knowledge of the data sequence entered thereby.

42. A method of operating a lock system by manual entry of at least one code in the form of a series of code elements using a keyboard, each said code element having a first plurality of possible code element variations, said method comprising the steps of:

(a) providing a second plurality of manually operable code element entry keys for said keyboard, said second plurality being less in number than said first plurality, wherein said first plurality of code element variations is partitioned into a plurality of groups of said code element variations, each said group having a third number of said code element variations, which code element variations are substantially randomly selected from said first number of code element variations, said third number being less than or equal to said second plurality, and wherein each said code element variation belongs to only one of said groups;

(b) providing a display logically associated with each of said keys, whereby the code element variations belonging to one of said groups are displayed, one group at a time, and whereby all possible code element variations of each code element may be displayed, and wherein each said code element variation is substantially randomly associated with one of said keys and wherein each said data element variation is logically associated with one of said keys for selection by manual depression of the respective said key;

(c) providing a keyboard control coupled to said keys and said display, wherein said keyboard control provides for variably controlling said display to vary the logical associations of code elements with keys from time to time;

(d) using said code element entry keys for entry of code elements, and whereby observance of a sequence of manual key actuations without seeing the then assigned key-code element associations does not convey knowledge of the code entered thereby;

(e) enabling and disabling a specific action with a lock control; and (f) providing a controller coupled to said keyboard control and said lock control for comparing a code manually entered through said keyboard with at least one predetermined code, and activating said lock control in response to a match between the manually entered code and the predetermined code.

43. A method of manual entry of a code in the form of a series of code elements using a keyboard, said keyboard having one manually operable data element entry key, and each said code element having a number of possible code element variations, said method comprising the steps of:

(a) providing a display logically associated with said key for displaying said code element variations, one by one, whereby all possible variations of each code element may be displayed and wherein a first code element variation is substantially randomly assigned to said key for selection by manual depression of the key;

(b) providing a keyboard control coupled to said key and said display, wherein said keyboard control provides for variably controlling said display for each code element entry to display each code element variation, one after another for selection by depressing the key, and for successive key entries, displaying each code element variation, one after another, in a sequence differing in some manner from the previous sequence; and (c) using a key for entry of code elements, each having a number of possible variations, and wherein observance of a sequence of manual key actuations or the timing thereof without seeing the then assigned key-code element variation associations does not convey knowledge of the code entered thereby.

44. A method of operating a lock system by manual entry of at least one code in the form of a series of code elements using a keyboard, each said code element having a first plurality of possible code element variations, said method comprising the steps of:

(a) providing a second plurality of manually operable data element entry keys for said keyboard, whereby each said key is positioned with respect to each other so that each may be logically associated with a code element position, wherein said second plurality is less in number than said first plurality, and wherein said first plurality of code element variations is partitioned into a plurality of groups of said code element variations, each said group having a third number of said code element variations which code element variations are substantially randomly selected from said first number of code element variations, said third number being less than or equal to said second plurality, and wherein each said code element variation belongs to only one of said groups;

(b) providing a display logically associated with each of said keys, whereby the code element variations belonging to one of said groups are displayed, one group at a time, and whereby all possible variations of each code element may be displayed, one at a time and wherein each said code element variation is substantially randomly associated with one of said keys for selection as the respective code element by manual operation of the respective keys while the desired code element variation of that code element is being displayed;

(c) providing a keyboard control coupled to said keys and said display, wherein said keyboard control provides for variably controlling said display to cause each display to start displaying one at a time, all variations of each code element, and to receive as a code element entry for the respective code position, the code element variation displayed at the time the respective key was depressed;

(d) enabling and disabling a specific action with a lock control; and (e) providing a controller coupled to said keyboard control and said lock control for comparing a code manually entered through said keyboard with at least one predetermined code, and activating said lock control in response to a match between the manually entered code and the predetermined code.

45. A method of operating a lock system by manual entry of at least one code in the form of a series of code elements using a keyboard, each said code element having a first plurality of possible code element variations, said method comprising the steps of:

(a) providing a second plurality of manually operable data element entry keys for said keyboard, said second plurality being less in number than said first plurality, wherein said first plurality of groups of said code element variations, each said group having a third number of said code element variations, which code element variations are substantially randomly selected from said first number of code element variations, said third number being less than or equal to said second plurality and, wherein each said code element variation belongs to only one of said groups;

(b) providing a display logically associated with each of said keys, whereby the code element variations belonging to one of said groups are displayed, one group at a time, and whereby all possible variations of each code element variation is substantially randomly associated with one of said keys for selection as the respective code element by manual operation of the respective keys while the desired code element variation of that code element is being displayed;

(c) providing a keyboard control coupled to said keys and said display, wherein said keyboard control provides for controlling said display to cause each display to start displaying one at a time, all variations of each code element, and to receive as a code element entry for the respective code position, the code element variation displayed at the time the respective key was depressed; and (d) controlling said display by said keyboard control to start displaying, one at a time, the variations of each code element in a different manner for subsequent code element entries.

* * * * *